US012780198B2

(12) United States Patent
Alenius et al.

(10) Patent No.: US 12,780,198 B2
(45) Date of Patent: Nov. 3, 2026

(54) CONTROL DEVICE AND METHOD FOR CONTROLLING A CRUISE CONTROL SYSTEM

(71) Applicant: Scania CV AB, Södertälje (SE)

(72) Inventors: Mikael Alenius, Segeltorp (SE); Christian Wessel, Rönninge (SE); Oscar Flärdh, Älvsjö (SE); Mikael Ögren, Naperville, IL (US)

(73) Assignee: Scania CV AB, Södertälje (SE)

( * ) Notice: Subject to any disclaimer, the term of this patent is extended or adjusted under 35 U.S.C. 154(b) by 120 days.

(21) Appl. No.: 18/511,577

(22) Filed: Nov. 16, 2023

(65) Prior Publication Data

US 2024/0190432 A1 Jun. 13, 2024

(30) Foreign Application Priority Data

Dec. 7, 2022 (SE) .................................... 2251430-1

(51) Int. Cl.
*B60W 30/16* (2020.01)
*B60W 50/10* (2012.01)

(52) U.S. Cl.
CPC .......... *B60W 30/162* (2013.01); *B60W 50/10* (2013.01); *B60W 2552/00* (2020.02)

(58) Field of Classification Search
None
See application file for complete search history.

(56) References Cited

U.S. PATENT DOCUMENTS 8,744,718 B2 * 6/2014 Johansson .............. B60K 31/00 340/988
11,318,958 B2 * 5/2022 Qin ..................... B60W 60/001
12,420,819 B2 * 9/2025 Kuehner ............... B60W 30/16
12,662,122 B2 * 6/2026 Stamp .................. B60W 30/16
(Continued)

FOREIGN PATENT DOCUMENTS

DE 102016106273 A1 10/2016
DE 102016012411 A1 5/2017
(Continued)

OTHER PUBLICATIONS (SE) Novelty Search—App. No. 2251430-1.
Jul. 28, 2026—DE Office Action—Application No. 102023130991.9.

*Primary Examiner* — Jonathan M Dager
(74) *Attorney, Agent, or Firm* — Banner & Witcoff, Ltd.

(57) ABSTRACT

A control device and a method for controlling a cruise control system of a host vehicle are provided. The method comprises simulating vehicle speed of the host vehicle for an upcoming road section under a condition of a predetermined torque limitation (Tq_lim) being active, thereby determining a simulated vehicle speed profile for the host vehicle. The method optionally further comprises determining (S202) an estimated following distance profile, relative to a target vehicle, for the host vehicle for the upcoming road section based on the simulated vehicle speed profile for the host vehicle. The method also comprises, in response to a determination that the simulated vehicle speed profile for the host vehicle fulfils a first predefined condition or that the optionally determined estimated following distance profile fulfils a second predefined condition, activating (S104, S205) the predetermined torque limitation (Tq_lim), if not already active.

15 Claims, 5 Drawing Sheets

(56) References Cited

U.S. PATENT DOCUMENTS

| | | | | |
|---|---|---|---|---|
| 2013/0085651 | A1* | 4/2013 | Johannsson | B60W 50/0097 701/93 |
| 2013/0297174 | A1 | 11/2013 | Lacaze et al. | |
| 2014/0074370 | A1* | 3/2014 | Johansson | B60K 31/00 701/93 |
| 2014/0074371 | A1* | 3/2014 | Johansson | B60W 30/143 701/93 |
| 2014/0343818 | A1* | 11/2014 | Johansson | G05B 13/048 701/94 |
| 2014/0350821 | A1* | 11/2014 | Johansson | B60W 30/143 701/93 |
| 2015/0107556 | A1* | 4/2015 | Johansson | B60W 10/06 123/350 |
| 2015/0191170 | A1* | 7/2015 | Johansson | B60K 31/00 701/94 |
| 2015/0314780 | A1* | 11/2015 | Stenneth | B60W 30/00 701/1 |
| 2016/0297435 | A1* | 10/2016 | D'Amato | B60W 30/143 |
| 2017/0036543 | A1* | 2/2017 | Tschanz | B60K 31/0008 |
| 2017/0137029 | A1* | 5/2017 | Dynes | B60W 30/18072 |
| 2017/0297572 | A1* | 10/2017 | Roos | B60W 10/06 |
| 2018/0037213 | A1 | 2/2018 | Wu et al. | |
| 2019/0186561 | A1* | 6/2019 | Follen | F16D 48/06 |
| 2019/0263400 | A1 | 8/2019 | Chunodkar et al. | |
| 2019/0338849 | A1* | 11/2019 | Chunodkar | B60W 30/143 |
| 2020/0387167 | A1* | 12/2020 | Sujan | B60W 30/143 |
| 2021/0025136 | A1 | 1/2021 | Harper | |
| 2021/0213948 | A1* | 7/2021 | Lahti | B60W 30/162 |
| 2022/0281450 | A1* | 9/2022 | Gruender | B60W 40/105 |
| 2022/0402487 | A1* | 12/2022 | He | B60W 30/16 |
| 2023/0115240 | A1* | 4/2023 | Sidhu | B60W 40/04 701/25 |
| 2023/0150502 | A1* | 5/2023 | Dickson | B01D 53/92 701/95 |
| 2023/0398989 | A1* | 12/2023 | Held | B60L 15/2027 |
| 2024/0123990 | A1* | 4/2024 | Follen | B60W 30/16 |
| 2024/0375653 | A1* | 11/2024 | Selling | B60W 30/16 |
| 2025/0381957 | A1* | 12/2025 | Luna | B60K 31/0008 |

FOREIGN PATENT DOCUMENTS

| | | | |
|---|---|---|---|
| DE | 102019113926 | A1 | 4/2020 |
| WO | 2014026986 | A1 | 2/2014 |

* cited by examiner

CONTROL DEVICE AND METHOD FOR CONTROLLING A CRUISE CONTROL SYSTEM

This Application claims priority from Application 2251430-1 filed on Dec. 7, 2022, in Sweden. The entire contents of this application is incorporated herein by reference in its entirety.

TECHNICAL FIELD

The present disclosure relates in general to a method for controlling a cruise control system of a host vehicle. The present disclosure further relates in general to a control device configured to control a cruise control system of a host vehicle. Moreover, the present disclosure relates in general to a computer program and a computer-readable medium. The present disclosure also relates in general to a cruise control system. Furthermore, the present disclosure relates in general to a vehicle.

BACKGROUND

Heavy vehicles, such as busses and trucks, are today often equipped with various cruise control systems configured to control vehicle speed for various purposes, such as to reduce energy consumption of the vehicle, improve safety in the operation of the vehicle and/or improve driver comfort. There are various types of cruise control systems. These are configured to operate according to different control functions and therefore may result in different effects on for example the operation of the vehicle.

Some of these cruise control systems are configured to predict a future behavior of the vehicle if the vehicle is controlled according to different control strategies, taking into account for example data regarding characteristics of upcoming road sections. These predictions, which may be determined through simulations, are thereafter used for the purpose of determining the most appropriate strategy for controlling the vehicle for the upcoming road section. One example of such a cruise control system is a look-ahead cruise control (sometimes also referred to as a predictive cruise control). A look-ahead cruise control is a cruise control system which uses information regarding an upcoming road section and that may plan a vehicle speed profile for the upcoming road section based on said information. Said information regarding the upcoming road section may typically be derived from map data in combination with information regarding geographical positioning of the vehicle, but may in some situations also be derived from sensors arranged in or on the vehicle and/or supplemented with for example historical data relating to the upcoming road section. The look-ahead cruise control may thereafter control the vehicle speed in accordance with the planned vehicle speed profile as the vehicle travels the road section in question. Look-ahead cruise controllers have the advantage of being able to save substantial amounts of energy (such as fuel) compared to for example conventional constant speed cruise controllers which are configured to maintain a substantially constant vehicle speed.

Yet another example of a cruise control system is an adaptive cruise control, which is configured to automatically adjust the vehicle speed in order to maintain a safe distance to one or more vehicles ahead of the vehicle comprising the adaptive cruise control. An adaptive cruise control typically uses information from sensors arranged in or on the vehicle, such as radar, laser or cameras, for the purpose of obtaining information regarding the surroundings of the vehicle. It should here be noted that both a constant speed cruise control and a look-ahead cruise control may be supplemented with an adaptive cruise control function, if desired.

In general, a propulsion unit, such as a combustion engine, of a vehicle has a maximum torque/power capacity. This maximum torque capacity is a consequence of the constraints of the propulsion unit and is dependent of the speed of the propulsion unit. Driving a vehicle at highest possible power of a propulsion unit typically increases the energy consumption of the vehicle, which in turn leads to increased operating costs of the vehicle. For example, when burning fuel in a combustion engine of a vehicle at maximum torque, there is usually a shortage of air which in turn leads to inefficient combustion. This in turn unduly increases the fuel consumption. In case of a propulsion unit in the form of an electric machine, the power losses increase squared with the current, resulting in inefficient operation at higher power demands.

For the purpose of reducing the energy consumption of the vehicle, it is previously known to apply a torque limitation which limits the torque that may be requested from the propulsion unit. In other words, such a torque limitation reduces the torque that may be requested from the propulsion unit from the maximum capacity thereof to a lower maximum limit. The torque limitation may for example be applied by a suitable controller therefore. The drawback with the strategy of applying a torque limitation may however be that the drivability of the vehicle may be impaired as a result of the propulsion unit not outputting sufficient torque to handle all driving situations. For example, a torque limitation may result in the output torque of the propulsion unit being insufficient to maintain a desired speed when travelling a steep uphill grade.

Cruise control systems may typically be activated and deactivated by e.g. a driver of the vehicle. In certain situations, cruise control systems may cause the vehicle to behave differently from what may be expected by the driver and/or in a way that causes irritation to the driver. This may for example be the case if a torque limitation as mentioned above is active. In case the vehicle does not behave as expected by the driver, the driver may be inclined to deactivate the cruise control system and thereby not taking advantage of the benefits thereof. It is therefore also important to develop cruise control systems that cause the vehicle to behave as expected by the driver for the purpose of increasing the driver's willingness to utilize the cruise control system and making use of the advantages thereof.

WO 2014/026986 A1 discloses an example of a method for operating a speed control system of a vehicle. The method comprises, if the torque required to achieve a desired operating parameter of the vehicle exceeds a predetermined torque limit, determining whether it is appropriate to increase the torque limit. The desired operating parameter may be a vehicle speed. The method further comprises, when it is determined that it is appropriate to do so, increasing the predetermined torque limit. In accordance with the described method, the torque required to achieve the desired operating parameter of the vehicle is determined when the vehicle is traversing the prevailing terrain and is thus dependent of information received from sensors onboard the vehicle. It is also described that, when the predetermined torque limit has been increased, the method may comprise monitoring operating parameters of the vehicle and adjusting the increased torque limit based on the monitored parameters.

SUMMARY

The object of the present invention is to further improve energy consumption of a vehicle, while operating a cruise control system, without negatively affecting drivability of the vehicle.

The object is achieved by the subject-matter of the appended independent claim(s).

The present disclosure provides a method, performed by a control device, for controlling a cruise control system of a host vehicle. Said cruise control system is configured to control vehicle speed in dependence of a set speed through control of output torque of at least one propulsion unit of the host vehicle. The method comprises a step of simulating vehicle speed of the host vehicle for an upcoming road section under a condition of a predetermined torque limitation being active and in consideration of a current set speed of the cruise control, thereby determining a simulated vehicle speed profile for the host vehicle, wherein said predetermined torque limitation limits the output torque that the cruise control system may request from the at least one propulsion unit. The method optionally further comprises a step of determining an estimated following distance profile, relative to a target vehicle, for the host vehicle for the upcoming road section based on the simulated vehicle speed profile for the host vehicle. The method further comprises a step of, in response to a determination that the simulated vehicle speed profile for the host vehicle fulfils a first predefined condition or that the optionally determined estimated following distance profile fulfils a second predefined condition, activating the predetermined torque limitation, if not already active.

By means of the herein described method, the predetermined torque limitation may be activated as soon as it is determined that it will not negatively affect the drivability of the host vehicle for an upcoming road section. The drivability is here represented by the simulated vehicle speed profile for the host vehicle fulfilling a first predefined criterion, or (where applicable) the determined estimated following distance profile fulfilling the second predefined criterion.

More specifically, the fact that the herein described method uses simulation of future behavior of the host vehicle reduces the risk of activation of the predetermined torque limitation in situations where it may have a negative impact on the drivability, for example in situations where the host vehicle is approaching a steep uphill road section for which the propulsion unit would not be able to deliver sufficient torque to maintain a desired vehicle speed of the cruise control system if the predetermined torque limitation would be active. The fact that the herein described method uses simulation of future behavior of the host vehicle also means that activation of the predetermined torque limitation may be made earlier compared to for example in case of activation in reaction to a determination that the vehicle is currently experiencing a driving situation where the predetermined torque limitation would be acceptable. In other words, the herein described method allows for an improved use of the predetermined torque limitation, which in turn enables a reduction in energy consumption of the vehicle. An improved energy consumption of the host vehicle also has a direct impact on the operating costs of the host vehicle.

Furthermore, in view of the herein described method uses simulation of future behavior of the host vehicle, the risk of the vehicle behaving differently from what a possible driver thereof may expect may be significantly reduced. This in turn has the possibility of increasing a driver's willingness to utilize the cruise control system and thus taking advantage of the intended purposes of the cruise control system, such as reduced energy consumption of the vehicle, improved safety and/or increased comfort.

The first predefined criterion may be that the minimum vehicle speed defined by the simulated vehicle speed profile for the host vehicle is equal to or higher than a predefined minimum threshold speed, said predefined minimum threshold speed being dependent of the current set speed of the cruise control system. Alternatively, the first predefined criterion may be that a difference between an integral of a reference speed profile of the host vehicle for the upcoming road section and an integral of the simulated vehicle speed profile for the host vehicle is equal to or less than a predefined limit. Irrespectively of which of the alternatives of the first predefined criterion is used in the herein described method, it ensures that the drivability of the host vehicle is not negatively affected by having the predetermined torque limitation active.

In case the first predefined criterion is that a difference between an integral of a reference speed profile of the host vehicle for the upcoming road section and an integral of the simulated vehicle speed profile for the host vehicle is equal to or less than a predefined limit, the method may further comprise a step of determining the reference speed profile of the host vehicle for the upcoming road section based on a condition of the predetermined torque limitation being inactive and in consideration of the current set speed of the cruise control system. By using a reference curve determined this way, the first predefined condition is related to a loss of distance that the host vehicle, when travelling the upcoming road section and the vehicle speed is controlled by the cruise control system in dependence of the set speed, would experience as a result of the predetermined torque limitation being active compared to if the predetermined torque limitation would be inactive.

The method may further comprise a step of, in response to a determination that the simulated vehicle speed profile for the host vehicle does not fulfil the first predefined condition, simulating an adjusted vehicle speed profile of the host vehicle for the upcoming road section under the condition of the predetermined torque limitation being active and based on adjusted control parameters of the cruise control system leading to an increase of vehicle speed during a portion of the upcoming road section. The method may then further comprise a step of, in response to a determination that the simulated adjusted vehicle speed profile of the host vehicle fulfils the first predefined condition, activating the predetermined torque limitation, if not already active, and controlling the cruise control system according to the adjusted control parameters. This results in a more energy efficient operation of the host vehicle as the possible utilization of the predetermined torque limitation, without negatively affecting the drivability of the host vehicle, is extended.

The method may further comprise a step of, in response to a determination that the simulated vehicle speed profile for the host vehicle does not fulfil the first predefined condition, deactivating the predetermined torque limitation when it is determined that a positive acceleration of the host vehicle, sufficient to a reach a vehicle speed equal to or above the current set speed of the cruise control system, is no longer possible with the predetermined torque limitation maintained active. Thereby, the predetermined torque limitation may be maintained active longer compared to, for example, if it would be deactivated as soon as it is determined that the simulated vehicle speed profile does not fulfill the first predefined criterion. Furthermore, it is ensured that the deactivation of the predetermined torque limitation is made before the operation of the host vehicle is negatively affected by the predetermined torque limitation. More specifically, the deactivation is performed just before the host vehicle would start to lose so much vehicle speed, as a result of the predetermined torque limitation being active, that the drivability of the host vehicle would be negatively affected. In case deactivation of the predetermined torque limitation is made too late, for example in reaction to a detection that the deliverable torque of the at least one propulsion unit is insufficient to maintain a desired drivability of the host vehicle, the energy consumption of the host vehicle would in most cases be considerably higher to compensate for the late deactivation of the predetermined torque limitation, or it may, in worst case, no longer be possible to compensate for the undesired loss of vehicle speed when the predetermined torque limitation is deactivated.

The method may further comprise a step of, in response to a determination that the simulated vehicle speed profile for the host vehicle does not fulfil the first predefined condition, deactivating the predetermined torque limitation when the host vehicle reaches, or is expected to reach, an actual vehicle speed corresponding to a peak vehicle speed of the simulated vehicle speed profile. Said peak vehicle speed of the simulated vehicle speed profile may optionally be the maximum vehicle speed defined by the simulated vehicle speed profile. Thereby, the predetermined torque limitation may be maintained active longer compared to, for example, if it would be deactivated as soon as it is determined that the simulated vehicle speed profile does not fulfill the first predefined criterion. Furthermore, deactivation of the predetermined torque limitation when the vehicle has reached, or is expected to reach, an actual vehicle speed corresponding to said peak vehicle speed of the simulated vehicle speed profile enables an easy control at the same time as it is ensured that the host vehicle has not started to lose too much vehicle speed, as a result of the predetermined torque limitation, before it is deactivated.

The above mentioned second predefined condition may be that a maximum following distance, relative to a target vehicle, defined by the determined estimated following distance profile for the host vehicle is equal to or below a predefined maximum allowable distance threshold. Thereby, it ensured that the predetermined torque limitation does not negatively affect the drivability of the host vehicle by resulting in an inability to maintain a desired following distance to a target vehicle.

The method may further comprise a step of, in response to a determination that the determined estimated following distance profile does not fulfil the second predefined condition, deactivating the predetermined torque limitation when it is determined that an acceleration of the host vehicle, sufficient to a reach a following distance equal to or less than a predefined reference following distance, is no longer possible with the predetermined torque limitation maintained active. Thereby, it ensured that the predetermined torque limitation may be maintained active longer than, for example, if deactivation would be made as soon as it is determined that the second predefined criterion is not fulfilled. This further improves the energy efficiency of the host vehicle. Furthermore, it is ensured that the deactivation is performed before the host vehicle may risk reaching a following distance greater that the predefined maximum allowable distance threshold, as a result of the predetermined torque limitation being active. Thereby, it is ensured that the drivability is not negatively affected by the extended used of the predetermined torque limitation.

The method may further comprise a step of, in response to a determination that the determined estimated following distance profile does not fulfil the second predefined condition, deactivating the predetermined torque limitation when the host vehicle reaches, or is expected to reach, a following distance to the target vehicle corresponding to a predefined minimum following distance threshold. Thereby, it is ensured that deactivation is performed before the host vehicle starts to lose too much vehicle speed, relative to the speed of the target vehicle, such that the following distance will start to increase as result of the predetermined torque limitation being active.

The method may further comprise, in response to a determination that the determined estimated following distance profile does not fulfil the second predefined condition, deactivating the predetermined torque limitation when the host vehicle reaches, or is expected to reach, a following distance to the target vehicle corresponding to a predefined minimum following distance threshold unless the host vehicle has a vehicle speed equal to or higher than the current set speed of the cruise control system or the host vehicle may, with the predetermined torque limitation maintained active, be positively accelerated to a vehicle speed equal to or higher than the current set speed of the cruise control system. In case the host vehicle has a vehicle speed equal to or higher than the current set speed of the cruise control system or the host vehicle may, with the predetermined torque limitation maintained active, be positively accelerated to a vehicle speed equal to or higher than the current set speed of the cruise control system, the drivability of the host vehicle would not be negatively affected by the predetermined toque limitation being maintained active. Therefore, for the purpose of energy efficiency of the host vehicle, the predetermined torque limitation can be maintained even when the second predefined criterion is not fulfilled.

The method according to the present disclosure may further comprise, in response to a driver-initiated request for acceleration of the vehicle, deactivating the predetermined torque limitation, if not already inactive. A driver-initiated request for acceleration of the vehicle may be indicative of a driver seeking to temporarily increase the vehicle speed above the current set speed of the cruise control system. In such a case, the predetermined torque limitation may risk negatively affecting the desired drivability of the host vehicle and should therefore not be maintained active.

The method according to the present disclosure may further comprise, in response to a determination of loss of map data, deactivating the predetermined torque limitation, if not already inactive. Loss of map data typically means that sufficiently accurate simulations of a vehicle speed profiles for upcoming road sections cannot be made. Thus, by deactivating the predetermined torque limitation in case of loss of map data, it is ensured that the predetermined torque limitation cannot negatively affect the drivability of the host vehicle.

The present disclosure also provides a computer program comprising instructions which, when executed by a control device, cause the control device to carry out the method as described above.

The present disclosure also provides a computer-readable medium comprising instructions which, when executed by a control device, cause the control device to carry out the method as described above.

Furthermore, the present disclosure provides a control device configured to control a cruise control system of a host vehicle, said cruise control system configured to control vehicle speed in dependence of a set speed through control of output torque of at least one propulsion unit of the host vehicle. The control device is configured to simulate vehicle speed of the host vehicle for an upcoming road section under a condition of a predetermined torque limitation being active and in consideration of a current set speed of the cruise control, thereby determining a simulated vehicle speed profile for the host vehicle, wherein said predetermined torque limitation limits the output torque that the cruise control system may request from the at least one propulsion unit. The control device may optionally further be configured to determine an estimated following distance profile, relative to a target vehicle, for the host vehicle for the upcoming road section based on the simulated vehicle speed profile for the host vehicle. Moreover, the control device is configured to, in response to a determination that the simulated vehicle speed profile for the host vehicle fulfils a first predefined condition or that the optionally determined estimated following distance profile fulfils a second predefined condition, activate the predetermined torque limitation, if not already active.

The control device provides the same advantages as described above with regard to the corresponding method for controlling a cruise control system.

The present disclosure also provides a cruise control system for a vehicle, said cruise control system comprising the control device configured to control a cruise control system as described above.

The present disclosure also provides a vehicle comprising the control device configured to control a cruise control system as described above. The vehicle may be a heavy vehicle, such as a bus or a truck, but is not limited thereto. Furthermore, the vehicle may be a vehicle partly or fully operated by a driver or be a fully autonomous vehicle. Moreover, the vehicle may be driven by a combustion engine, be a hybrid vehicle, or be a fully electric vehicle.

DEFINITIONS

Figure 1:
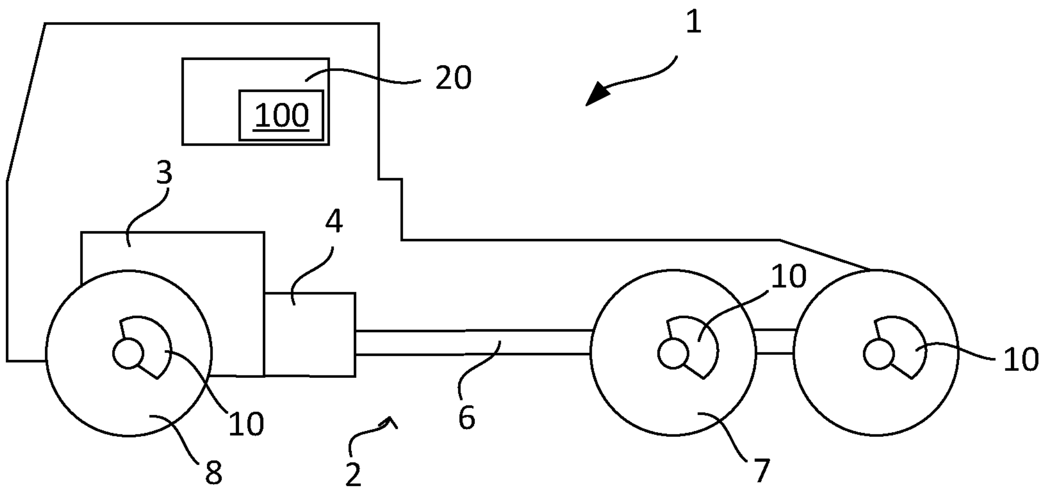
FIG. 1 schematically illustrates a side view of an example of a vehicle.

In the present disclosure, the term “host vehicle” should be considered to mean a vehicle whose vehicle speed is, or may be, controlled by the herein described cruise control system.

The term “target vehicle” is intended to mean a vehicle, different from the host vehicle, and present in front of the host vehicle as seen in a current travelling direction of the host vehicle.

Furthermore, a “following distance” is herein considered to mean a distance between the host vehicle and a target vehicle. A following distance may typically be controlled based on a desired time before the host vehicle reaches a position of the target vehicle, and is therefore dependent of the respective speeds of the host vehicle and the target vehicle.

Moreover, the term “upcoming road section” is herein used to describe a section of the road in front of a vehicle (more specifically the host vehicle), and which said vehicle is about to travel on. The upcoming road section may suitably be a road section immediately in front of the vehicle, but the present disclosure is not limited thereto. The upcoming road section may for example start a few meters in front of the vehicle.

Moreover, the term “torque limitation” is in the present disclosure considered to mean a function which activates a limitation of the torque that is allowed to be requested from a propulsion unit. A limitation of the requestable torque also inherently affects the available output torque from the propulsion unit. In other words, a torque limitation reduces the available output torque from a propulsion unit below the maximum torque capacity of the propulsion unit.

The term “driver” is in the present disclosure considered to encompass a person available onboard the vehicle and driving the vehicle as well as a person controlling the vehicle from a location remote from the vehicle (such as at a remote control center), unless explicitly disclosed otherwise.

DETAILED DESCRIPTION

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

In accordance with the present disclosure, a method for controlling a cruise control system of a host vehicle is provided. The cruise control system is configured to control the vehicle speed of the host vehicle in dependence of a set speed through control of output torque of at least one propulsion unit of the host vehicle. Said control of output torque of the at least one propulsion unit is affected by requesting a certain output torque from the at least one propulsion unit. The cruise control system may also be configured to control the vehicle speed of the host vehicle in dependence of a set speed through control of one or more brake systems of the vehicle. The set speed may be a speed selected by a driver of the vehicle or by a control system of the vehicle. The cruise control system may for example be a look-ahead cruise control system, suitably supplemented with an adaptive cruise control function.

The herein described method for controlling the above-described cruise control system comprises a step of simulating vehicle speed of the host vehicle for an upcoming road section. Thereby, a simulated vehicle speed profile is determined for the host vehicle. The simulated vehicle speed profile defines simulated vehicle speed at different distance points along the upcoming road section and at least comprises the extreme points, i.e. the simulated maximum vehicle speed together with its associated distance point as well as the simulated minimum vehicle speed with its associated distance point. The simulated vehicle speed profile may comprise or consist of a plurality of simulated discrete values of vehicle speed at various distance points along the road section. Suitably, the simulated vehicle speed profile may be a simulated continuous vehicle speed profile. Simulation of a vehicle speed profile for an upcoming road section per se is nowadays well known to a person skilled in the art and will therefore not be described in detail here. Examples of factors that may typically be considered in such a simulation, in addition to geographical data (including topography) relating to the upcoming road section, include for example vehicle configuration, vehicle load etc. Advanced simulations of vehicle speed profiles may also take into consideration additional factors, such as weather conditions and/or road conditions. However, in accordance with the herein described method, the simulation of vehicle speed is made under the condition of a predetermined torque limitation being active and in consideration of a current set speed of the cruise control. When active, the predetermined torque limitation limits the output torque that the cruise control system may request form the at least one propulsion unit. The predetermined torque limitation may suitably be a predefined torque limitation for the at least one propulsion unit and may for example be dependent of different performance modes, which in turn may be selected by a driver of the vehicle. Thus, it should be recognized that there may be a plurality of predetermined torque limitations available depending on the specific circumstances.

The above described step of simulating vehicle speed for the host vehicle is preferably made under the condition of assuming that a delivered output torque by said at least one propulsion unit corresponds to the maximum torque defined by said predetermined torque limitation. Thus, the simulated vehicle speed profile for the host vehicle corresponds to a situation where the maximum torque defined by the predetermined torque limitation would be used while the host vehicle travels the upcoming road section and while the vehicle speed is controlled by the cruise control system. The fact that the host vehicle is controlled by the cruise control system means that the maximum speed of the host vehicle would be limited by a predefined maximum threshold speed dependent of the current set speed of the cruise control system. A reduction of vehicle speed may be made by braking the host vehicle. However, the same is not valid for a minimum speed of the host vehicle since, in case there is not sufficient propulsion torque available, the host vehicle may not be able to be positively accelerated to a vehicle speed corresponding to a predefined minimum threshold speed dependent of the current set speed of the cruise control system. Thus, the simulated vehicle speed profile of the host vehicle may comprise vehicle speeds below said predefined minimum threshold speed but not above said predefined maximum threshold speed.

In case the cruise control system comprises an adaptive cruise control function, the method may further comprise a step of determining an estimated following distance profile, relative to a target vehicle, for the host vehicle for the upcoming road section based on the simulated vehicle speed profile for the host vehicle and either an assumed/predicted vehicle speed profile of the target vehicle or information derived from the target vehicle, for example information relating to a planned speed profile of the target vehicle for the upcoming road section.

The method according to the present disclosure further comprises a step of, in response to a determination that the simulated vehicle speed profile for the host vehicle fulfils a first predefined condition, or that the optionally determined estimated following distance profile fulfils a second predefined condition, activating the predetermined torque limitation, if not already active.

In accordance with previously known methods, a predetermined torque limitation may be activated by default at certain predefined conditions. However, the herein described method enables activation of the predetermined torque limitation as soon as it does not risk negatively affecting the drivability of the host vehicle when the vehicle speed in controlled by the cruise control system. This may, at least in some cases, enable activation of the predetermined torque limitation at an earlier stage compared to preciously known methods. Furthermore, it reduces the risk of activation of the predetermined torque limitation when it is not appropriate to do so.

The above described steps of determining the simulated vehicle speed profile, of optionally determining the estimated following distance profile and of determining whether the simulated vehicle speed profile fulfils the first predefined criterion or the optionally determined estimated following distance profile fulfills the second predefined criterion may suitably be repeated for example at predetermined intervals (such as at 5-10 seconds intervals or the like) or continuously. Furthermore, the upcoming road section for which each simulated vehicle speed profile is determined may suitably be at least 500 meters. Thus, it should be recognized that a first simulated vehicle speed profile may be determined not to fulfill the first predefined criterion but a second simulated vehicle speed profile, immediately following the first simulated vehicle speed profile, may be determined to fulfill the first predefined criterion.

The first predefined criterion may according to a first alternative be that the minimum vehicle speed defined by the simulated vehicle speed profile for the host vehicle is equal to or higher that a predefined minimum threshold speed. Said minimum predefined minimum threshold speed is dependent of the current set speed of the cruise control system, and defines the minimum allowable speed that the cruise control is configured to maintain. In other words, the first predefined criterion according to the first alternative tests that the vehicle speed of the host vehicle would not fall below the predefined minimum threshold speed in case the predetermined torque limitation would be active as the host vehicle travels the upcoming road section.

According to a second alternative, the first predefined criterion may be that a difference between an integral of a reference speed profile of the host vehicle for the upcoming road section and an integral of the simulated vehicle speed profile of the host vehicle (also being for the upcoming road section) is equal to or less than a predefined limit. The reference speed profile of the host vehicle may for example correspond to driving at the current set speed of the cruise control system for the whole upcoming road section. Alternatively, the reference speed profile of the host vehicle may be determined by simulating vehicle speed of the host vehicle for the upcoming road section based on a condition of the predetermined torque limitation being inactive and in consideration of the current set speed of the cruise control system. The difference of the integrals of the reference speed profile and the simulated vehicle speed profile corresponds to a loss of distance that the host vehicle would experience when travelling along the upcoming road section compared to if travelling in accordance with the reference speed profile. Such a loss of distance affects the drivability of the host vehicle and may for example be experienced as annoying to a driver of the vehicle.

The second predefined criterion may be that a maximum following distance, relative to a target vehicle, defined by the determined estimated following distance profile for the host vehicle is equal to or below a predefined maximum allowable distance threshold. The drivability of the host vehicle may be negatively affected in case the host vehicle is not able, as a result of the predetermined torque limitation being active, to maintain a following distance which is at least equal to the predefined maximum allowable distance threshold.

In addition to the ability to activate the predetermined torque limitation as soon as it would not risk negatively affecting the drivability of the host vehicle (an thereby improve energy efficiency in the operation of the host vehicle), it is also important to consider when to deactivate the predetermined torque limitation. Thus, the herein described method may suitably also comprise a step of deactivating the predetermined torque limitation before it may negatively affect the drivability of the host vehicle. One possible strategy for when to deactivate the predetermined torque limitation would be when it is detected the cruise control system requests the maximum torque available, as a result of the torque limitation being active, from the at least one propulsion unit and the host vehicle starts to lose vehicle speed. This is however not the most energy efficient solution as it may increase the energy consumption of the vehicle. Furthermore, it may in worst case not even be possible to maintain the desired drivability even if the predetermined torque limitation is deactivated, for example if the vehicle is travelling a long steep uphill. An alternative strategy would be to deactivate the predetermined torque limitation as soon as it is determined that a simulated vehicle speed profile does not fulfil the first predefined criterion or that an estimated following distance profile does not fulfil the second predefined condition. However, nor does such a strategy lead to the most energy efficient result as it would reduce the time the predetermined torque limitation would be active.

To overcome this, the herein described method provides the ability for maintaining the predetermined torque limitation active as long as possible before it may risk negatively affecting the drivability of the host vehicle before deactivation thereof. This may be achieved by different alternatives as will be described in more detail below. For all alternatives, the deactivation of the predetermined torque limitation is not performed as long as the first predefined condition or the second predefined condition, whichever is applicable, is fulfilled.

In some cases, it may even be possible to avoid that the predetermined torque limitation has to be deactivated even though it has been determined that the simulated vehicle speed profile does not fulfil the first predefined condition or the estimated following distance profile does not fulfill the second predefined condition. For example, in some cases it may be possible to adjust control parameters of a cruise control system such that the host vehicle does not risk losing too much vehicle speed. As a simple example thereof, in case the upcoming road section comprises an uphill, it could be possible to increase the vehicle speed before the host vehicle reaches said uphill to thereby avoid that the vehicle speed would be too low at the end of the uphill. Therefore, the herein described method may comprise, in response to a determination that the simulated vehicle speed profile for the host vehicle does not fulfil the first predefined condition, simulating an adjusted vehicle speed profile of the host vehicle for the upcoming road section under the condition of the predetermined torque limitation being active and based on adjusted control parameters of the cruise control system leading to an increase of vehicle speed during a portion of the upcoming road section. The method may then further comprise a step of, in response to a determination that the simulated adjusted vehicle speed profile of the host vehicle fulfils the first predefined condition, activating the predetermined torque limitation, if not already active, and controlling the cruise control system according to the adjusted control parameters. An example of a situation where the predetermined torque limitation may be maintained active even though the estimated following distance profiled does not fulfill the second predefined condition is if the host vehicle is already travelling, and is expected to continue to travel, with a vehicle speed equal to or higher than the current set speed of the cruise control system.

In accordance with the present method, deactivation of the predetermined torque limitation may be made, in case the simulated vehicle speed profile for the host vehicle does not fulfill the first predefined condition, when it is determined that a positive acceleration of the host vehicle, sufficient to reach a vehicle speed equal to or above the current set speed of the cruise control system, is no longer possible with the predetermined torque limitation maintained active. Described differently, as long as the host vehicle may be positively accelerated to at least the current set speed of the cruise control system, the predetermined torque limitation may be maintained active.

Alternatively, deactivation of the predetermined torque limitation may be made, in case the simulated vehicle speed profile for the host vehicle does not fulfill the first predefined condition, when the host vehicle reaches, or is expected to reach, an actual vehicle speed corresponding to a peak vehicle speed of the simulated vehicle speed profile.

In case the estimated following distance profile does not fulfil the second predefined condition, deactivation of the predetermined torque limitation may be made when it is determined that an acceleration of the host vehicle, sufficient to a reach a following distance equal to or less than a predefined reference following distance, is no longer possible with the predetermined torque limitation maintained active. It can here be noted that such an acceleration of the host vehicle will naturally be dependent of the vehicle speed of the target vehicle. Alternatively, deactivation of the predetermined torque limitation, when it is determined that the second predefined condition is not fulfilled, may be made when the host vehicle reaches, or is expected to reach, a following distance to the target vehicle corresponding to a predefined minimum following distance threshold.

The method according to the present disclosure may further comprise, in response to a driver-initiated request for acceleration of the vehicle, deactivating the predetermined torque limitation, if not already inactive. A driver-initiated request for acceleration of the vehicle may be indicative of a driver seeking to temporarily increase the vehicle speed above the current set speed of the cruise control system, for example when overtaking another vehicle. In such a case, the predetermined torque limitation may risk negatively affecting the desired drivability of the host vehicle and should therefore preferably not be maintained active.

The method according to the present disclosure may further comprise, in response to a determination of loss of map data, deactivating the predetermined torque limitation, if not already inactive. Loss of map data typically means that sufficiently accurate simulations of a vehicle speed profiles for upcoming road sections cannot be made as these are dependent of map data. Thus, by deactivating the predetermined torque limitation in case of loss of map data, it is ensured that the predetermined torque limitation cannot negatively affect the drivability of the host vehicle if said vehicle would, for example, reach a steep uphill or the like.

The performance of the herein described method for controlling a cruise control system of a host vehicle may be governed by programmed instructions. These programmed instructions typically take the form of a computer program which, when executed in or by a control device, causes the control device to effect desired forms of control actions. Such instructions may typically be stored on a computer-readable medium.

The present disclosure further relates to a control device configured to control a cruise control system of a host vehicle in accordance with the method described above. The control device may be configured to perform any one of the steps of the method for controlling a cruise control system of a host vehicle as described herein.

More specifically, the present disclosure provides a control device configured to control a cruise control system of a host vehicle, wherein said cruise control system is configured to control vehicle speed in dependence of a set speed through control of output torque of at least one propulsion unit of the host vehicle. The control device is configured to simulate vehicle speed of the host vehicle for an upcoming road section under a condition of a predetermined torque limitation being active and in consideration of a current set speed of the cruise control, thereby determining a simulated vehicle speed profile for the host vehicle. Said predetermined torque limitation limits the output torque that the cruise control system may request from the at least one propulsion unit. The control device may optionally further be configured to determine an estimated following distance profile, relative to a target vehicle, for the host vehicle for the upcoming road section based on the simulated vehicle speed profile for the host vehicle. The control device is further configured to, in response to a determination that the simulated vehicle speed profile for the host vehicle fulfils a first predefined condition or that the optionally determined estimated following distance profile fulfils a second predefined condition, activate the predetermined torque limitation, if not already active.

The control device may comprise one or more control units. In case the control device comprises a plurality of control units, each control unit may be configured to control a certain function/action or a certain function/action may be divided between more than one control units. The control device may be a control device of the vehicle. Alternatively, one or more control units of the control device may be arranged remote from the vehicle, for example at a remote control center or the like.

The herein described control device may be fully incorporated in the cruise control system of the host vehicle, or partly or fully separated from said cruise control system. In case of not constituting a part of the cruise control system as such, the control device is at least configured to communicate therewith for the purpose of the herein described control thereof.

The present disclosure also relates to a vehicle comprising the above-described control device. The vehicle may for example be a land-based heavy vehicle, such as a truck or a bus, but is not limited thereto. The vehicle may be configured to be operated by a driver (fully or partially) or be an autonomous vehicle. The vehicle comprises at least one propulsion unit. Said at least one propulsion unit may for example be a combustion engine or an electric machine. According to one embodiment, the vehicle may be driven by a combustion engine only. Alternatively, the vehicle may be a hybrid vehicle in which case the vehicle comprises an electrical machine in addition to a combustion engine. The vehicle may also be a fully electrical vehicle in which case it does not comprise a combustion engine, but comprises one or more electrical machines acting as propulsion unit(s).

FIG. 1 schematically illustrates a side view of an example of a vehicle 1, which may be the host vehicle described herein. The vehicle 1 comprises a powertrain 2 comprising a combustion engine 3 serving as a propulsion unit. The powertrain 2 may further comprise a gearbox 4. The combustion engine 3 may be connected to the gearbox via a clutch (not shown). The gearbox 4 may be connected to the driving wheels 7 of the vehicle 1 via an output shaft 6 of the gearbox 4. The vehicle further comprises front wheels 8. The vehicle 1 may typically comprise service brakes 10 arranged at the respective driving wheels 7, and preferably also at any other wheel of the vehicle as shown in the figure. Albeit not shown in the figure, the vehicle 1 may further comprise one or more auxiliary brake systems. Examples of such auxiliary brake systems include, but are not limited to, a retarder, a compression release brake system and an exhaust brake system.

As previously mentioned, the present disclosure is not limited to a vehicle driven by a combustion engine. The vehicle 1 may additionally, or alternatively, comprise one or more electrical machines (not shown) powered by an energy storage device. In case the vehicle comprises at least one electrical machine, the vehicle may also comprise an auxiliary brake system in the form of a regenerative brake system (not shown). In a regenerative brake system, an electrical machine may be operated as generator for the purpose of converting kinetic energy of the vehicle to electrical energy which may be used to charge an energy storage device (not shown) of the vehicle. The energy stored in the energy storage device may thereafter be used for the purpose of driving the electrical machine when the electrical machine is operated as a propulsion unit of the vehicle.

The vehicle 1 further comprises a cruise control system 20 configured to control the vehicle speed of the vehicle 1. More specifically, the cruise control system 20 may be configured to control the vehicle speed in dependence of a set speed through control of output torque of the combustion engine 3 and typically also the service brakes 10 and/or auxiliary brake system(s) of the vehicle 1. It should here be noted that the cruise control system 20 may also be configured to control the output torque of one or more electrical machines serving as propulsion unit(s), where applicable.

The vehicle further comprises a control device 100 configured to control the cruise control system 20. The control device 100 may be a part of the cruise control system 20, as shown in the figure. Alternatively, the control device 100 may be separate from the cruise control system 20, but configured to communicate therewith for the purpose of control thereof.

Figure 2:
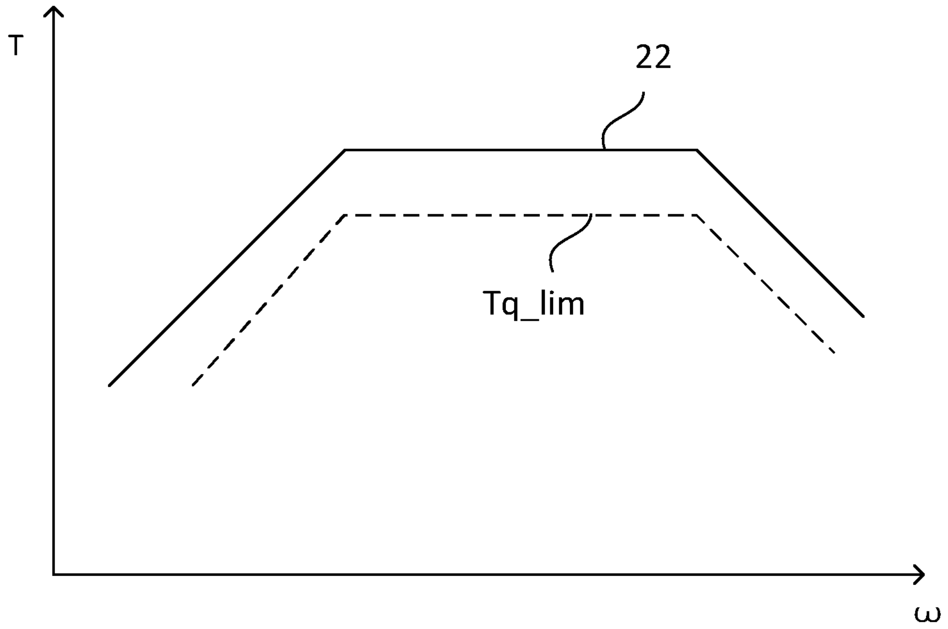
FIG. 2 represents a graph of propulsion unit torque versus rotational speed of a propulsion unit in the form of a combustion engine.

FIG. 2 represents a graph of propulsion unit torque T versus rotational speed c of a propulsion unit and illustrates an example of a maximum torque curve 22 of a combustion engine, such as the combustion engine 3 of the vehicle 1 shown in FIG. 1. The maximum torque curve 22 defines the physical constraint of the combustion engine. FIG. 2 also illustrates an example of a predetermined torque limitation Tq_lim. The predetermined torque limitation Tq_lim, when active, limits the deliverable output torque of the combustion engine and thus also the torque that may be requested from combustion engine by for example a cruise control system. The predetermined torque limitation Tq_lim may be determined based on the configuration of the combustion engine as well as desired efficiency of the combustion engine and/or various control functions of the vehicle. For example, the predetermined torque limitation Tq_lim may for example vary depending on performance mode of the vehicle (such as economy mode, standard driving mode or power driving mode). One or more predetermined torque limitations for a certain propulsion unit may be stored in a suitable database therefore as known in the art.

Figure 3:
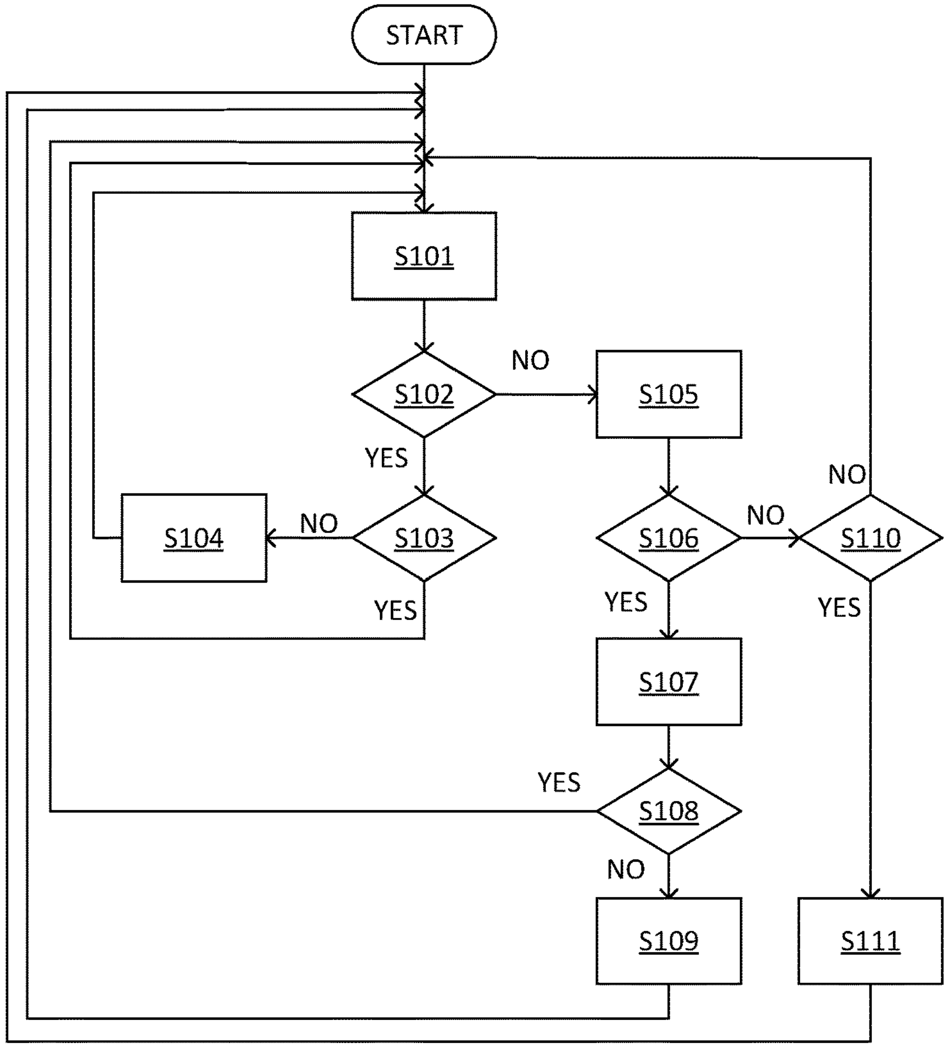
FIG. 3 represents a flowchart schematically illustrating a first exemplifying embodiment of the herein described method for controlling a cruise control system of a host vehicle, FIG. 4. illustrates an example of a simulated vehicle speed profile of the host vehicle for an upcoming road section.

FIG. 3 represents a flowchart schematically illustrating a first exemplifying embodiment of the herein described method for controlling a cruise control system of a host vehicle.

The method comprises a step S101 of simulating vehicle speed for the host vehicle for an upcoming road section under a condition of a predetermined torque limitation being active and in consideration of a current set speed of the cruise control. Thereby, a simulated vehicle speed profile is determined for the host vehicle for the upcoming road section. The simulation of vehicle speed for the host vehicle may suitably be made based on the assumption that the delivered torque for a propulsion unit of the vehicle corresponds to the maximum deliverable torque as defined by the predetermined torque limitation.

The method further comprises a step S102 of determining whether the simulated vehicle speed profile, determined in step S101, fulfils a first predefined criterion. According to the first exemplifying embodiment, said first predefined criterion is that the minimum vehicle speed defined by the simulated vehicle speed profile for the host vehicle is equal to or higher than a predefined minimum threshold speed, wherein said predefined minimum threshold speed is dependent of a current set speed of the cruise control system.

In case it is determined in step S102 that the first predefined criterion is fulfilled, the method proceeds to a step S103 of determining whether or not the predetermined torque limitation is currently active. In case it is determined in step S103 that the predetermined torque limitation is active, the method may be reverted to start. However, in case it is determined in step S103 that the predetermined torque limitation is currently inactive, the method proceeds to a step S104 of activating the predetermined torque limitation.

In case it is determined in step S102 that the first predefined criterion is not fulfilled, the method may proceed to a step S105 of simulating an adjusted vehicle speed profile for the host vehicle for the upcoming road section under the condition of the predetermined torque limitation being active and based on adjusted control parameters of the cruise control system leading to an increase of vehicle speed during a portion of the upcoming road section. After step S105, the method may proceed to a step S106 of determining whether the simulated adjusted vehicle speed profiled for the host vehicle fulfils a first predefined condition. It may here be noted that steps S102 and S106 are in essence the same step with the exception of different simulated vehicle speed profiled being compared with the first predefined criterion of the minimum vehicle speed defined by the respective vehicle speed profiles being equal to or higher than the predefined minimum speed threshold.

In case it is determined in step S106 that the simulated adjusted vehicle speed profile fulfils the first predefined criterion, the method may proceed to a step S107 of controlling the cruise control system according to the adjusted control parameters and a step S108 of determining whether the predetermined torque limitation is currently active. In case it is determined in step S108 that the predetermined torque limitation is not currently active, the method may proceed to a step S109 of activating the predetermined torque limitation. Thereafter, the method may be reverted to start. Moreover, in case it is determined in step S108 that the predetermined torque limitation is currently active, the method may be reverted to start. In the figure, the step S107 is shown to be performed before step S108 and thus also before step S109. It should however be noted that step S107 may be performed in parallel with steps S108 and S109, or even after these steps.

Furthermore, in case it is determined in step S106 that the simulated adjusted vehicle speed profile does not fulfil the first predefined criterion, the method may proceed to a step S110 of determining whether the predetermined torque limitation is currently active. In case it is determined in step S110 that the predetermined torque limitation is not active, the method may revert to start. However, in case it is determined that the predetermined torque limitation is active, the method may proceed to a step S111 of deactivating the predetermined torque limitation. After step S111, the method may be reverted to start.

The deactivation of the predetermined torque limitation in step S111 may according to a first alternative be made a point in time at which the host vehicle reaches, or is expected to reach, an actual vehicle speed corresponding to a peak vehicle speed of the simulated vehicle speed profile. At such a point in time, the host vehicle will likely not yet have started to lose speed as a result of the predetermined torque limitation being active but will do so thereafter. According to a second alternative, the deactivation of the predetermined torque limitation in step S111 may be performed when it is determined that a positive acceleration of the host vehicle, sufficient to a reach a vehicle speed equal to or above the current set speed of the cruise control system, is no longer possible with the predetermined torque limitation maintained active. As long as the host vehicle may be given a positive acceleration sufficient to reach a vehicle speed equal to or above the current set speed of the cruise control system, the predetermined torque limitation will not negatively affect the drivability of the vehicle and may therefore remain active for the purpose of improving efficiency as described above. It should here be recognized that this means that the deactivation of the predetermined torque limitation is typically not performed directly when it is determined that a simulated vehicle speed profile does not fulfill the first predefined, but at a point in time at which the vehicle has already started to travel the upcoming road section for which said simulated vehicle speed profile was determined.

If desired, the method according to the first exemplifying embodiment may be simplified by cancellation of the steps S105 to S109. In such a case, the method proceeds directly to step S110 in case it is determined in step S102 that the first predefined criterion is not fulfilled.

Figure 4:
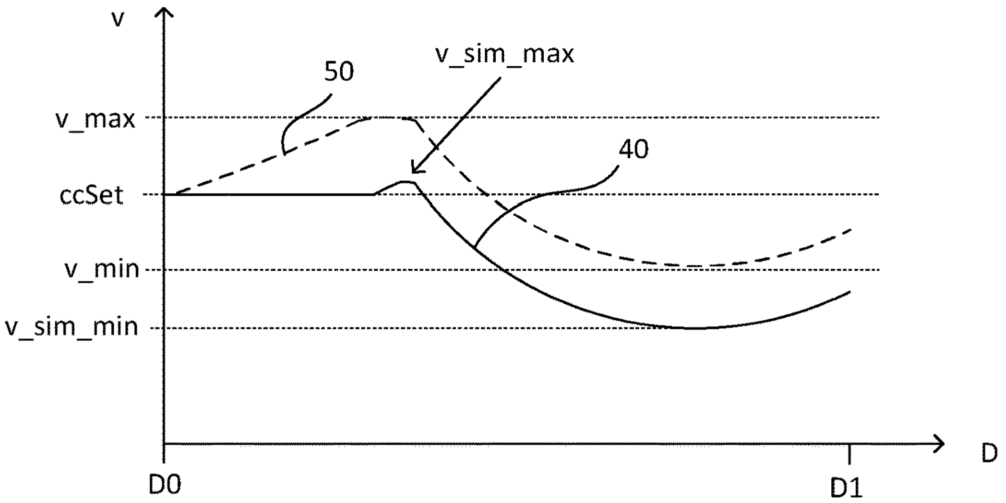

FIG. 4 illustrates an example of a simulated vehicle speed profile 40 of a host vehicle for an upcoming road section, starting at DO and ending at D1. The simulated vehicle speed profile 40 is determined based on a condition of a predetermined torque limitation being active and in consideration of a current set speed ccSet of the cruise control system. It is commonly known in the art that a cruise control system is configured to control the vehicle speed to be maintained within a vehicle speed range about the set speed ccSet, said range being defined by a minimum threshold speed v_min and a maximum threshold vehicle speed v_max. In other words, each of the minimum threshold speed v_min and the maximum threshold speed v_max is dependent of the current set speed ccSet.

In the example shown in FIG. 4, the simulated vehicle speed profile 40 defines a minimum vehicle speed v_sim_min which is below the minimum threshold speed v_min. This means that the host vehicle will not be able to maintain a vehicle speed within the allowable speed range about the current set speed ccSet for the whole upcoming road section in case the predetermined torque limitation is active. Thus, the simulated vehicle speed profile 40 does not fulfill the first predefined criterion of the minimum vehicle speed defined by the simulated vehicle speed profile being equal to or higher than the predefined minimum threshold speed which is dependent of the current set speed of the cruise control system (i.e. v_min) according to the first exemplifying embodiment. Therefore, the drivability of the host vehicle would be negatively affected in case the predetermined torque limitation is active for the whole duration of the vehicle passing the upcoming road section.

However, the simulated vehicle speed profile 40 exemplified in FIG. 4, defines for an initial portion of the upcoming road section an essentially constant vehicle speed about the ccSet speed with a slight increase of vehicle speed until it reaches a maximum vehicle speed v_sim_max defined by the simulated vehicle speed profile. In the figure, v_sim_max is shown to be very close to the ccSet speed, but this need not necessarily always be the case. According to the illustrated example, the drivability of the host vehicle would not be negatively affected by the predetermined torque limitation being active during this initial portion of the upcoming road section. Therefore, for the purpose of energy efficiency of the host vehicle, the predetermined torque limitation may suitably be active until the host vehicle reaches, or is expected to reach, an actual vehicle speed corresponding to v_sim_max. In other words, deactivation of the predetermined torque limitation should suitably be delayed until the host vehicle reaches, or is expected to reach, an actual vehicle speed corresponding to v_sim_max.

It should here be recognized that the simulated vehicle speed profile 40 shown in FIG. 4 is a simplified example, and in practice a simulated vehicle speed profile may comprise a plurality of peaks and valleys. In such a case, deactivation of the predetermined torque limitation may be made when the host vehicle reaches, or is expected to reach an actual vehicle speed corresponding to a peak vehicle speed of the simulated vehicle speed profile. In the illustrated example there is only one peak speed, which is the v_sim_max. Suitably, deactivation of the predetermined torque limitation is performed when the host vehicle reaches, or is expected to reach, the peak speed of the simulated vehicle speed profile which is closest to the (first) instance at which the vehicle speed would fall below the predefined minimum threshold speed v_min as long as said peak speed is equal to or above ccSet.

Deactivation of the predetermined torque limitation when the host vehicle reaches, or is expected to reach, an actual vehicle speed corresponding to a peak vehicle speed of the simulated vehicle speed profile allows for a simplified control of the cruise control system because only the peak speed(s) and ccSet need to be considered. However, even more energy may be saved in case deactivation of the predetermined torque limitation is performed when it is determined that a positive acceleration of the host vehicle, sufficient to a reach a vehicle speed equal to or above the current set speed of the cruise control system, is no longer possible with the predetermined torque limitation maintained active. This is because the simulated vehicle speed profile may comprise valleys where the vehicle speed falls below ccSet, but is still above v_min, and the vehicle speed thereafter is increased to ccSet or even higher and only thereafter fall below v_min. The drivability of the host vehicle is not negatively affected as long as the host vehicle may be positively accelerated to at least ccSet and the torque limitation may therefore be maintained active.

As mentioned above with regard to the first exemplifying embodiment shown in FIG. 3, the method may further comprise, in case the first predefined criterion is not fulfilled, a step (see step S105) of simulating an adjusted vehicle speed profile for the host vehicle for the upcoming road section under the condition of the predetermined torque limitation being active and based on adjusted control parameters of the cruise control system leading to an increase of vehicle speed during a portion of the upcoming road section. FIG. 4 also illustrates an example of such a simulated adjusted vehicle speed profile 50. In the example shown in the figure, the simulated adjusted vehicle speed profile 50 does not define a vehicle speed which is below v_min and thus fulfills the first predefined criterion. This means that, by controlling the cruise control system according to the adjusted control parameters, the predetermined torque limitation may be activated (if not already active) and maintained active for the whole duration of the vehicle passing the upcoming road section without negatively affecting the drivability of the vehicle.

Figure 5:
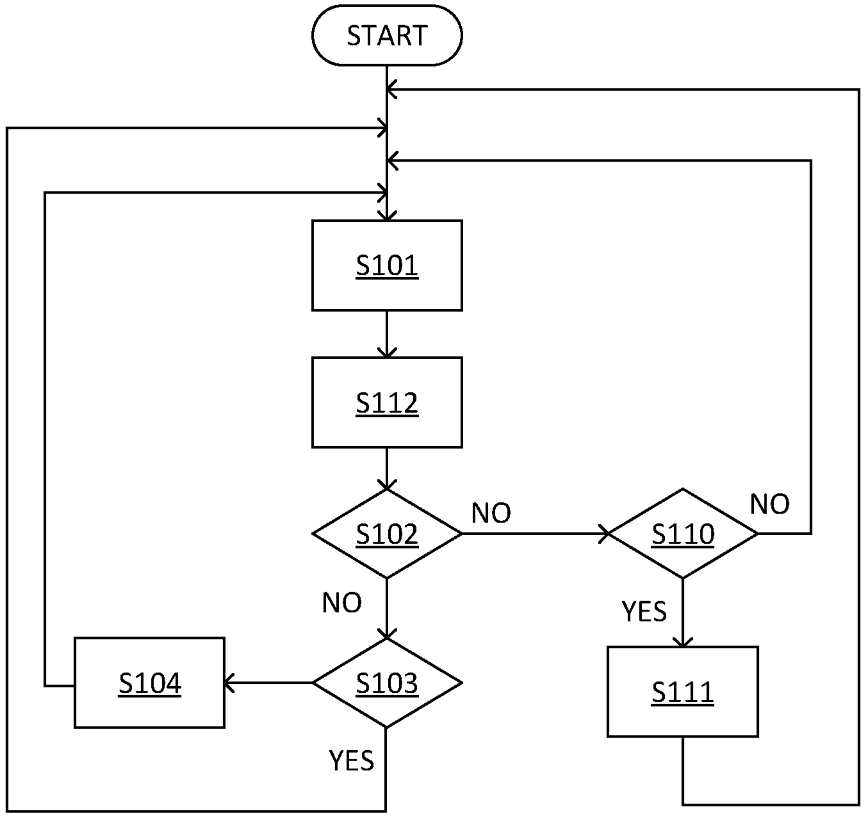
FIG. 5 represents a flowchart schematically illustrating a second exemplifying embodiment of the herein described method for controlling a cruise control system of a host vehicle.

FIG. 5 represents a flowchart schematically illustrating a second exemplifying embodiment of the herein described method for controlling a cruise control system of a host vehicle. Just like the first exemplifying embodiment, the method according to the second exemplifying embodiment of comprises a step S101 of simulating vehicle speed for the host vehicle for an upcoming road section under a condition of a predetermined torque limitation being active and in consideration of a current set speed of the cruise control. Thereby, a simulated vehicle speed profile is determined for the host vehicle for the upcoming road section.

However, in contrast to the first exemplifying embodiment, the first predefined criterion is that a difference between an integral of a reference speed profile of the host vehicle for the upcoming road section and an integral of the simulated vehicle speed profile for the host vehicle is equal to or less than a predefined limit according to the second exemplifying embodiment. For said purpose, the method may further comprise a step S112 of determining the reference speed profile of the host vehicle the upcoming road section. The determination of the reference speed profile may be based on a condition of the predetermined torque limitation being inactive and in consideration of the current set speed of the cruise control system. Determining the reference speed profile may suitably be made by simulation similar to the simulation of the vehicle speed profile of the host vehicle, but with the difference of the predetermined torque limitation not being active and with the constraints of the vehicle speed never being allowed to be outside of the range defined by the maximum and minimum threshold speeds within which the cruise control system is configured to maintain the vehicle speed.

In the figure, step S112 is illustrated as being performed after step S101. However, step S112 may be performed in parallel with, or before, step S101. Thus, the shown order of the steps S101 and S112 is not intended to be limiting the present disclosure.

After steps S101 and S112, the method proceeds to a step S102 of determining whether the simulated vehicle speed profile, determined in step S101, fulfils a first predefined criterion. In other words, in step S102 according to the second exemplifying embodiment it is determined whether the difference between the integral of a reference speed profile of the host vehicle for the upcoming road section and the integral of the simulated vehicle speed profile for the host vehicle is equal to or less than the predefined limit. Said difference between the integrals corresponds to a loss of distance of the host vehicle if travelling according to the simulated vehicle speed profile compared to if travelling according to the reference speed profile over the upcoming road section. Such a loss of distance may be experienced as annoying to a driver of the vehicle or for other road users and may also increase the needed travelling time for the upcoming road section.

In case it is determined in step S102 that the first predefined condition is fulfilled, the method proceeds to a step S103 of determining whether or not the predetermined torque limitation is currently active, just like in the method according to the first exemplifying embodiment. In case it is determined in step S103 that the predetermined torque limitation is active, the method may be reverted to start. However, in case it is determined in step S103 that the predetermined torque limitation is currently inactive, the method proceeds to a step S104 of activating the predetermined torque limitation in the same way as described above with regard to the first exemplifying embodiment of the herein described method.

As shown in the figure, the method may, in case it is determined in step S102 that the first predefined criterion is not fulfilled, proceed to a step S110 of determining whether the predetermined torque limitation is currently active. In case it is determined in step S110 that the predetermined torque limitation is not active, the method may revert to start. However, in case it is determined that the predetermined torque limitation is active, the method may proceed to a step S111 of deactivating the predetermined torque limitation in the same way as described above with regard to the first exemplifying embodiment. Alternatively, the method according to the second exemplifying embodiment may, in case it is determined in step S102 that the first predefined criterion is not fulfilled, proceed to the steps S105 to S109 described above with regard to the first exemplifying embodiment (with the exception of the first predefined criterion being different from the first predefined criterion according to the first exemplifying embodiment, which thus affects the determination performed in step S106).

It should here be noted that the method according to the second exemplifying embodiment need not necessarily comprise the above described step S112 of determining the reference speed profile of the host vehicle the upcoming road section. For example, the reference speed profile may be retrieved by the control device configured to perform the herein described method from another control device of the vehicle or otherwise already be available to the control device (for example by being determined as a part of another control method or the like).

Figure 6:
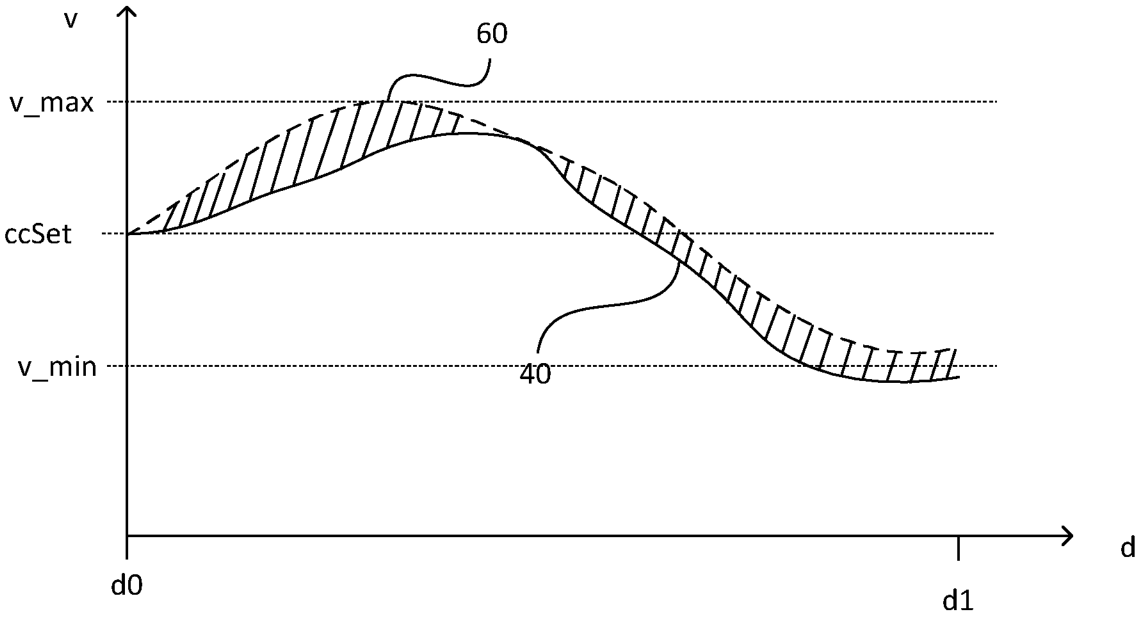
FIG. 6 illustrates an example of a simulated vehicle speed profile as well as an example of a reference speed profile of a host vehicle for an upcoming road section.

For the purpose of further clarifying the first predetermined condition according to the second exemplifying embodiment described above (and illustrated in FIG. 5), FIG. 6 illustrates an example of a simulated vehicle speed profile 40 as well as an example of a reference speed profile 60 for an upcoming road section as described above. The reference speed profile will only define vehicle speeds within the range of the current set speed ccSet, defined by the minimum threshold speed v_min and the maximum threshold vehicle speed v_max, as a result of the requisites of the cruise control system to maintain the vehicle speed within this range. However, the simulated vehicle speed profile 40 may define a minimum vehicle speed which is below v_min due to the active predetermined torque limitation.

The difference between the integral of the reference speed profile 60 of the host vehicle for the upcoming road section and the integral of the simulated vehicle speed profile 40 for the same road section is in the figure represented by the dashed area. This difference between the integrals of the speed profiles will result in a loss of distance of the host vehicle in case the predetermined torque limitation is active compared to if the host vehicle would travel according to the reference speed curve. Therefore, said difference should be equal to or less than a predefined limit in order for the predetermined torque limitation not negatively affecting the drivability of the vehicle, if active.

According to one alternative to the illustrated example of the reference speed profile 60 in FIG. 6, it is according to a further embodiment of the herein described method to simply use the assumption of the host vehicle driving at the current set speed ccSet for the whole upcoming road section and using this assumption as the reference speed curve. In other words, the reference speed profile may correspond to the current set speed ccSet of the cruise control system over the whole upcoming road section. Thereby, there is no need to simulate a reference speed curve based on a condition of the predetermined torque limitation being inactive, which e.g. saves computational efforts.

Figure 7:
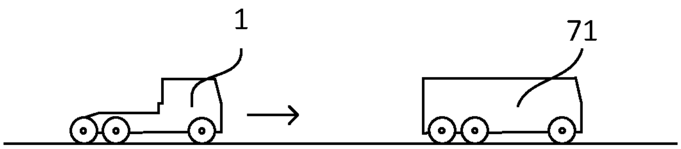
FIG. 7 illustrates an example of a situation where a host vehicle is travelling along a road with a target vehicle in front thereof.

The cruise control system may comprise an adaptive cruise control function which controls the vehicle speed of the host vehicle with the purpose of maintaining the distance to a target vehicle within a predefined range about a set reference distance. FIG. 7 illustrates an example of a situation where the host vehicle 1 is travelling in the direction of the arrow along a road with a target vehicle 71 in front of the host vehicle. The distance between the host vehicle and the target vehicle is the following distance.

Figure 8:
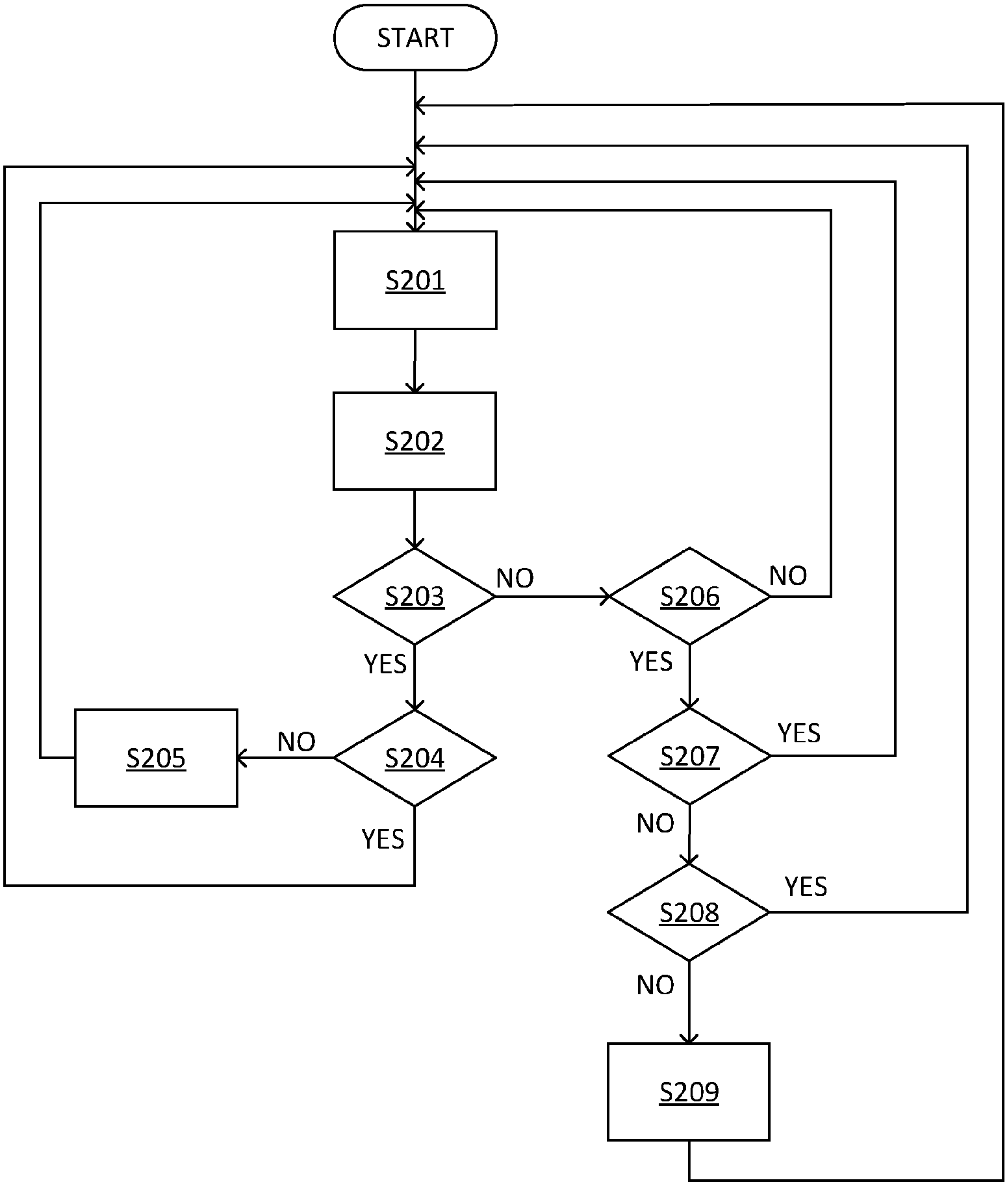
FIG. 8 represents a flowchart schematically illustrating a third exemplifying embodiment of the herein described method for controlling a cruise control system of a host vehicle.

FIG. 8 represents a flowchart schematically illustrating a third exemplifying embodiment of the herein described method for controlling a cruise control system of a host vehicle. In contrast to the previously described exemplifying embodiment, the third exemplifying embodiment considers a second predefined criterion as will be further described below.

The method according to the third exemplifying embodiment comprises a step S201 of simulating vehicle speed for the host vehicle for an upcoming road section under a condition of a predetermined torque limitation being active and in consideration of a current set speed of the cruise control. Thereby, a simulated vehicle speed profile is determined for the host vehicle for the upcoming road section. The simulation of vehicle speed for the host vehicle may suitably be made based on the assumption that the delivered torque for a propulsion unit of the vehicle corresponds to the maximum deliverable torque as defined by the predetermined torque limitation.

After step S201, the method comprises a step S202 of determining an estimated following distance profile, relative to a target vehicle, for the host vehicle for the upcoming road section. Said determination is made based on the simulated vehicle speed profile obtained from step S201 and either a predicted speed profile of the target vehicle for the upcoming road section or information obtained from the target vehicle regarding its planned speed profile for the upcoming road section. A predicted speed profile of the target vehicle may be determined in accordance with any previously known method therefore and will therefore not be discussed in the present disclosure.

The method then proceeds to a step S203 of determining whether the determined estimated following distance profile fulfils a second predefined condition. According to the present exemplifying embodiment, the second predefined condition is that a maximum following distance, relative to a target vehicle, defined by the determined estimated following distance profile for the host vehicle is equal to or below a predefined maximum allowable distance threshold. In other words, it is determined whether the following distance of the host vehicle to the target vehicle would be equal to or less than the predefined maximum distance threshold in case the predetermined torque limitation would be active.

In case it is determined in step S203 that the second predefined criterion is fulfilled, the method may proceed to a step S204 of determining whether the predetermined torque limitation is currently active. If it is determined in step S204 that it is active, the method may be reverted to start. However, in case it is determined in step S204 that the predetermined torque limitation is not active, the method proceeds to a step S205 of activating the predetermined torque limitation. After step S205, the method may revert to start.

In case it is determined in step S203 that the second predefined criterion is not fulfilled, the method may proceed to a step S206 of determining whether the predetermined torque limitation is currently active. In case it is determined in step S206 that the predetermined torque limitation is inactive, the method may revert to start.

However, in case it is determined in step S206 that the predetermined torque limitation is active, the method may proceed to a step S207 of determining whether the host vehicle has a vehicle speed equal to or higher than the current set speed of the cruise control system. In case the vehicle has such a speed, it may be acceptable to increase the following distance to the target vehicle further than the predefined maximum distance threshold as it would not negatively affect the drivability of the host vehicle. Therefore, the predetermined torque limitation may be maintained active. Thus, the method may revert to start in case it is determined in step S207 that the host vehicle has a vehicle speed equal to or higher than the current set speed of the cruise control system.

In case it is determined in step S207 that the host vehicle does not have a vehicle speed equal to or higher that the current set speed of the cruise control system, the method may proceed to a step S208 of determining whether the host vehicle may, with the predetermined torque limitation maintained active, be positively accelerated to a vehicle speed equal to or higher than the current set speed of the cruise control system. In case the vehicle may be positively accelerated to a vehicle speed equal to or higher than the current set speed of the cruise control system, it may be acceptable to increase the following distance to the target vehicle further than the predefined maximum distance threshold as it would not negatively affect the drivability of the host vehicle. Therefore, the predetermined torque limitation may be maintained active and the method may revert to start.

If it is determined in step S208 that the host vehicle no longer can, with the predetermined torque limitation maintained active, be positively accelerated to a vehicle speed equal to or higher than the current set speed of the cruise control system, the method proceeds to a step S209 of deactivating the predetermined torque limitation.

Although less preferred, the step S207 may be omitted from the method according to the third exemplifying embodiment, if desired. In such a case, the method may, in case it is determined in step S206 that the predetermined torque limitation is active, proceed directly to step S208. Alternatively, or additionally, step S208 may be omitted from the method according to the third exemplifying embodiment. In case both steps S207 and S208 are omitted, the method proceeds directly to step S209 in case it is determined in step S206 that the predetermined torque limitation is active. In the latter case, deactivation of the predetermined torque limitation may suitably be made when the host vehicle reaches, or is expected to reach, a following distance to the target vehicle corresponding to a predefined minimum following distance threshold. The reason therefore is that the vehicle would then not have started to lose any distance to the target vehicle and the drivability has therefore not yet been negatively affected by the predetermined torque limitation being active, but the drivability may thereafter be negatively affected. In case the predefined minimum following distance threshold may not be reached by the vehicle, the deactivation of the predetermined torque limitation may be made directly or at the latest when the vehicle reaches, or is expected to reach, a minimum following distance as defined by the estimated following distance profile.

Figure 9:
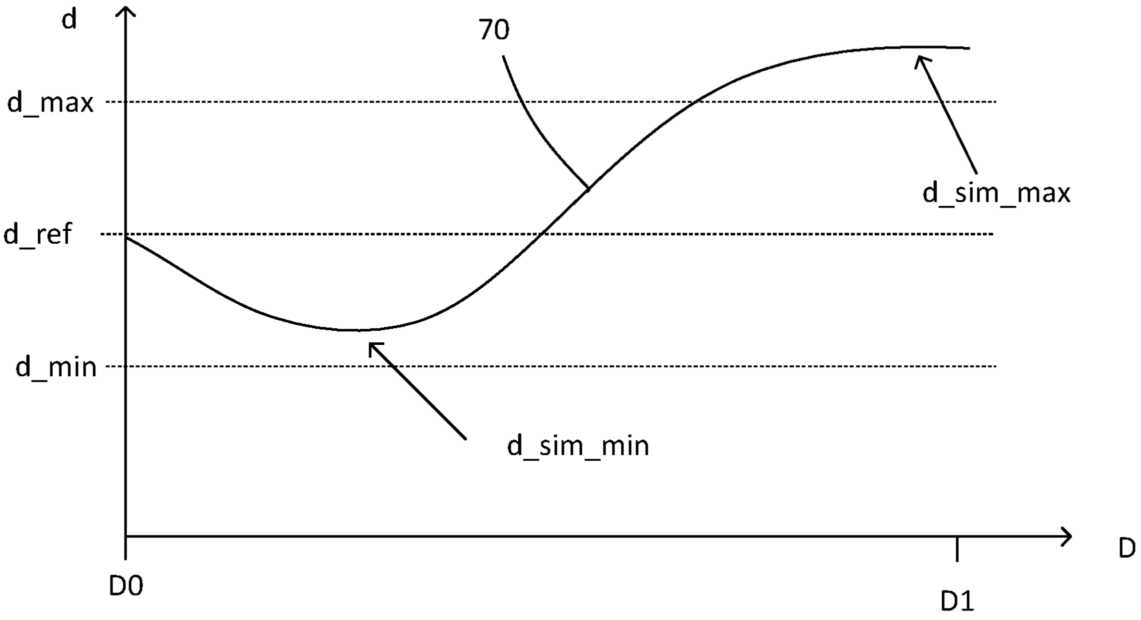
FIG. 9 illustrates an example of an estimated following distance profile, relative to a target vehicle, for a host vehicle for an upcoming road section, FIG. 10 schematically illustrates an exemplifying embodiment of a device that may comprise, consist of, or be comprised in the herein described control device configured to control a cruise control system of a host vehicle.

FIG. 9 illustrates an example of an estimated following distance profile 70, relative to a target vehicle, for a host vehicle for an upcoming road section, said road section starting at DO and ending at D1. The figure also illustrates a predefined reference following distance d_ref (a target following distance), which for example may be selected by a driver of the host vehicle or by the cruise control system as such. The cruise control system is configured to control the following distance to be maintained within a range about the predefined reference following distance d_ref, said range defined by a minimum following distance threshold d_min and a maximum following distance threshold d_max. The minimum and maximum following distance thresholds may be dependent of the current reference following distance.

The exemplified estimated following distance profile 70 is here shown to result in a maximum following distance d_sim_max which is above the maximum following distance threshold d_max. Thus, the exemplified estimated following distance profile does not fulfill the second predefined criterion. This means that if the predetermined torque limitation is active, the distance of the host vehicle to the target vehicle would increase above the maximum following distance threshold d_max when the host vehicle travels the upcoming road section. In case the host vehicle has a speed equal to or above a current set speed of the cruise control system, the drivability of the host vehicle will not be negatively affected. This only means that the target vehicle would drive away as a result of having a higher vehicle speed than the host vehicle, while the host vehicle maintains a vehicle speed equal to or higher than the current set speed. Therefore, the predetermined torque limitation may be maintained active (or activated, if not already active), without negatively affecting the drivability of the host vehicle, for the purpose of improving the energy efficiency of the host vehicle.

However, in case the host vehicle does not have a vehicle speed equal to or higher than the current set speed of the cruise control system, the drivability will be negatively affected as a result of the predetermined torque limitation as the host vehicle travels the upcoming road section. Therefore, the predetermined torque limitation should suitably be deactivated when it will start to negatively affect the drivability of the host vehicle. It should here be noted that this means that deactivation of the predetermined torque limitation need not be made as soon as it has been determined that the estimated following distance profile does not fulfill the second predefined criterion, but could in many instances be made at a later stage when the host vehicle has already started to travel the upcoming road section. In the exemplified estimated following distance profile 70 shown in FIG. 9, it can be seen that the host vehicle may reduce the following distance relative to the target vehicle until it reaches a minimum following distance d_sim_min defined by the estimated following distance profile 70. Thus, the predetermined torque limitation may be maintained active during the initial portion of the upcoming road section without negatively affecting the drivability of the host vehicle. However, when the following distance thereafter starts to increase, the drivability may eventually be negatively affected and the predetermined torque limitation should therefore be deactivated.

Figure 10:
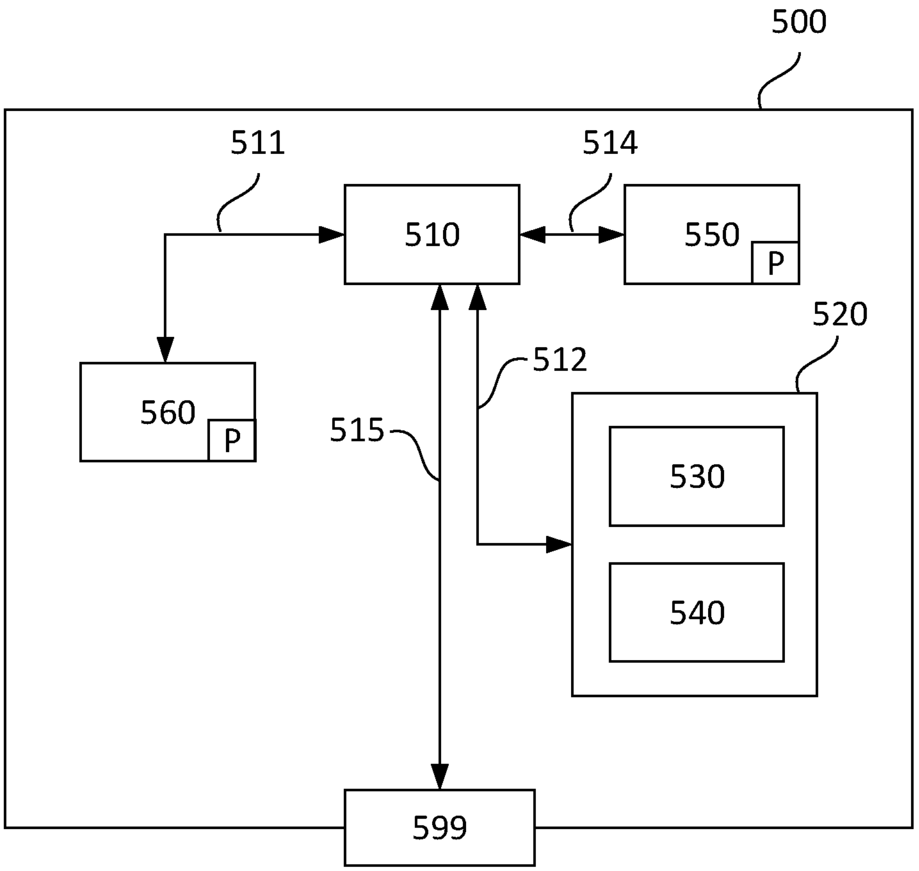

FIG. 10 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P comprising instructions for controlling a cruise control system of a host vehicle, wherein said cruise control system is configured to control vehicle speed in dependence of a set speed through control of output torque of at least one propulsion unit of the host vehicle. The computer program comprises instructions for simulating vehicle speed of the host vehicle for an upcoming road section under a condition of a predetermined torque limitation being active and in consideration of a current set speed of the cruise control, thereby determining a simulated vehicle speed profile for the host vehicle. Said predetermined torque limitation limits the output torque that the cruise control system may request from the at least one propulsion unit. The computer program may further comprise instructions for optionally determining an estimated following distance profile, relative to a target vehicle, for the host vehicle for the upcoming road section based on the simulated vehicle speed profile for the host vehicle. The computer program further comprises instructions for, in response to a determination that the simulated vehicle speed profile for the host vehicle fulfils a first predefined condition or that the optionally determined estimated following distance profile fulfils a second predefined condition, activating the predetermined torque limitation, if not already.

The program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be affected by the device 500 by means of the data processing unit 510 which runs the program stored in the memory 560 or the read/write memory 550. When the device 500 runs the program, methods herein described are executed.

The invention claimed is:

1. A method, performed by a control device, for controlling a cruise control system of a host vehicle, said cruise control system configured to control vehicle speed in dependence of a set speed (ccSet) through control of output torque of at least one propulsion unit of the host vehicle, the method comprising:

determining a simulated vehicle speed profile for the host vehicle based on simulating a vehicle speed of the host vehicle for an upcoming road section under a condition of a predetermined torque limitation (Tq_lim) being active and in consideration of a current set speed (ccSet) of the cruise control, wherein said predetermined torque limitation (Tq_lim) limits the output torque that the cruise control system may request from the at least one propulsion unit;

determining an estimated following distance profile, relative to a target vehicle, for the host vehicle for the upcoming road section based on the simulated vehicle speed profile for the host vehicle;

in response to a determination that the simulated vehicle speed profile for the host vehicle fulfils a first predefined condition or that the determined estimated following distance profile fulfils a second predefined condition, activating the predetermined torque limitation (Tq_lim), if not already active; and in response to a determination that the determined estimated following distance profile does not fulfil the second predefined condition, deactivating the predetermined torque limitation (Tq_lim) when it is determined that an acceleration of the host vehicle, sufficient to reach a following distance equal to or less than a predefined reference following distance (d_ref), is no longer possible with the predetermined torque limitation (Tq_lim) maintained active.

2. The method according to claim 1, wherein the first predefined condition is:

(i) that a minimum vehicle speed (v_sim_min) defined by the simulated vehicle speed profile for the host vehicle is equal to or higher than a predefined minimum threshold speed (v_min), said predefined minimum threshold speed (v_min) being dependent on the current set speed (ccSet) of the cruise control system; or (ii) that a difference between an integral of a reference speed profile of the host vehicle for the upcoming road section and an integral of the simulated vehicle speed profile for the host vehicle is equal to or less than a predefined limit.

3. The method according to claim 2, further comprising: determining the reference speed profile of the host vehicle for the upcoming road section based on a condition of the predetermined torque limitation (Tq_lim) being inactive and in consideration of the current set speed (ccSet) of the cruise control system.

4. The method according to claim 1, further comprising: in response to a determination that the simulated vehicle speed profile for the host vehicle does not fulfil the first predefined condition, simulating an adjusted vehicle speed profile of the host vehicle for the upcoming road section under the condition of the predetermined torque limitation (Tq_lim) being active and based on adjusted control parameters of the cruise control system leading to an increase of vehicle speed during a portion of the upcoming road section, and in response to a determination that the simulated adjusted vehicle speed profile of the host vehicle fulfils the first predefined condition, activating the predetermined torque limitation (Tq_lim), if not already active, and controlling the cruise control system according to the adjusted control parameters.

5. The method according to claim 1, further comprising: in response to a determination that the simulated vehicle speed profile for the host vehicle does not fulfil the first predefined condition, deactivating the predetermined torque limitation (Tq_lim) when it is determined that a positive acceleration of the host vehicle, sufficient to reach a vehicle speed equal to or above the current set speed (ccSet) of the cruise control system, is no longer possible with the predetermined torque limitation (Tq_lim) maintained active.

6. The method according to claim 1, further comprising: in response to a determination that the simulated vehicle speed profile for the host vehicle does not fulfil the first predefined condition, deactivating the predetermined torque limitation (Tq_lim) when the host vehicle reaches, or is expected to reach, an actual vehicle speed corresponding to a peak vehicle speed of the simulated vehicle speed profile, optionally wherein said peak vehicle speed of the simulated vehicle speed profile is a maximum vehicle speed (v_sim_max) defined by the simulated vehicle speed profile.

7. The method according to claim 1, wherein the second predefined condition is that a maximum following distance (d_sim_max), relative to the target vehicle, defined by the determined estimated following distance profile for the host vehicle is equal to or below a predefined maximum allowable distance threshold (d_max).

8. The method according to claim 1, further comprising: in response to a determination that the determined estimated following distance profile does not fulfil the second predefined condition, deactivating the predetermined torque limitation (Tq_lim) when the host vehicle reaches, or is expected to reach, a following distance to the target vehicle corresponding to a predefined minimum following distance threshold (d_min).

9. The method according to claim 1, further comprising: in response to a determination that the determined estimated following distance profile does not fulfil the second predefined condition, deactivating the predetermined torque limitation (Tq_lim) when the host vehicle reaches, or is expected to reach, a following distance to the target vehicle corresponding to a predefined minimum following distance threshold (d_min) unless the host vehicle has a vehicle speed equal to or higher than the current set speed (ccSet) of the cruise control system or the host vehicle may, with the predetermined torque limitation (Tq_lim) maintained active, be positively accelerated to a vehicle speed equal to or higher than the current set speed (ccSet) of the cruise control system.

10. The method according to claim 1, further comprising: in response to a driver-initiated request for acceleration of the host vehicle, deactivating the predetermined torque limitation (Tq_lim), if not already inactive.

11. The method according to claim 1, further comprising: in response to a determination of loss of map data, deactivating the predetermined torque limitation (Tq_lim), if not already inactive.

12. A non-transitory_computer-readable medium comprising instructions which, when executed by a control device for controlling a cruise control system of a vehicle, cause the control device to:

determine a simulated vehicle speed profile for the vehicle based on simulating a vehicle speed of the vehicle for an upcoming road section under a condition of a predetermined torque limitation (Tq_lim) being active and in consideration of a current set speed (ccSet) of the cruise control system, wherein said predetermined torque limitation (Tq_lim) limits an output torque that the cruise control system may request from at least one propulsion unit;

determine an estimated following distance profile, relative to a target vehicle, for the vehicle for the upcoming road section based on the simulated vehicle speed profile for the vehicle;

in response to a determination that the simulated vehicle speed profile for the vehicle fulfils a first predefined condition or that the determined estimated following distance profile fulfils a second predefined condition, activate the predetermined torque limitation (Tq_lim), if not already active; and in response to a determination that the determined estimated following distance profile does not fulfil the second predefined condition, deactivate the predetermined torque limitation (Tq_lim) when it is determined that an acceleration of the vehicle, sufficient to reach a following distance equal to or less than a predefined reference following distance (d_ref), is no longer possible with the predetermined torque limitation (Tq_lim) maintained active.

13. A control device configured to control a cruise control system of a host vehicle, said cruise control system configured to control vehicle speed in dependence of a set speed (ccSet) through control of output torque of at least one propulsion unit of the host vehicle, wherein the control device is configured to:

determine a simulated vehicle speed profile for the host vehicle based on simulat ing a vehicle speed of the host vehicle for an upcoming road section under a condition of a predetermined torque limitation (Tq_lim) being active and in consideration of a current set speed (ccSet) of the cruise control system, wherein said predetermined torque limitation (Tq_lim) limits the output torque that the cruise control system may request from the at least one propulsion unit;

determine an estimated following distance profile, relative to a target vehicle, for the host vehicle for the upcoming road section based on the simulated vehicle speed profile for the host vehicle;

in response to a determination that the simulated vehicle speed profile for the host vehicle fulfils a first predefined condition or that the optionally-determined estimated following distance profile fulfils a second predefined condition, activate the predetermined torque limitation (Tq_lim), if not already active; and in response to a determination that the determined estimated following distance profile does not fulfil the second predefined condition, deactivate the predetermined torque limitation (Tq_lim) when it is determined that an acceleration of the host vehicle, sufficient to reach a following distance equal to or less than a predefined reference following distance (d_ref), is no longer possible with the predetermined torque limitation (Tq_lim) maintained active.

14. A cruise control system for a vehicle, the cruise control system comprising a control device for controlling the cruise control system, wherein the control device is configured to:

determine a simulated vehicle speed profile for the vehicle based on simulating a vehicle speed of the vehicle for an upcoming road section under a condition of a predetermined torque limitation (Tq_lim) being active and in consideration of a current set speed (ccSet) of the cruise control system, wherein said predetermined torque limitation (Tq_lim) limits an output torque that the cruise control system may request from at least one propulsion unit;

determine an estimated following distance profile, relative to a target vehicle, for the vehicle for the upcoming road section based on the simulated vehicle speed profile for the vehicle;

in response to a determination that the simulated vehicle speed profile for the vehicle fulfils a first predefined condition or that the determined estimated following distance profile fulfils a second predefined condition, activate the predetermined torque limitation (Tq_lim), if not already active; and in response to a determination that the determined estimated following distance profile does not fulfil the second predefined condition, deactivate the predetermined torque limitation (Tq_lim) when it is determined that an acceleration of the vehicle, sufficient to reach a following distance equal to or less than a predefined reference following distance (d_ref), is no longer possible with the predetermined torque limitation (Tq_lim) maintained active.

15. A vehicle comprising a control device for controlling a cruise control system of the vehicle, wherein the control device is configured to:

determine a simulated vehicle speed profile for the vehicle based on simulating a vehicle speed of the vehicle for an upcoming road section under a condition of a predetermined torque limitation (Tq_lim) being active and in consideration of a current set speed (ccSet) of the cruise control system, wherein said predetermined torque limitation (Tq_lim) limits an output torque that the cruise control system may request from at least one propulsion unit;

determine an estimated following distance profile, relative to a target vehicle, for the vehicle for the upcoming road section based on the simulated vehicle speed profile for the vehicle;

in response to a determination that the simulated vehicle speed profile for the vehicle fulfils a first predefined condition or that the determined estimated following distance profile fulfils a second predefined condition, activate the predetermined torque limitation (Tq_lim), if not already active; and in response to a determination that the determined estimated following distance profile does not fulfil the second predefined condition, deactivate the predetermined torque limitation (Tq_lim) when it is determined that an acceleration of the vehicle, sufficient to reach a following distance equal to or less than a predefined reference following distance (d_ref), is no longer possible with the predetermined torque limitation (Tq_lim) maintained active.

* * * * *